US005127279A

United States Patent [19]

Barthruff

[11] Patent Number: 5,127,279

[45] Date of Patent: Jul. 7, 1992

[54] STARTING DEVICE FOR AN INTERNAL-COMBUSTION ENGINE WITH START-UP SHOCK DAMPING

[75] Inventor: Otto Barthruff, Stuttgart, Fed. Rep. of Germany

[73] Assignee: Robert Bosch GmbH, Stuttgart, Fed. Rep. of Germany

[21] Appl. No.: 603,770

[22] PCT Filed: May 30, 1989

[86] PCT No.: PCT/DE89/00339

§ 371 Date: Oct. 26, 1990

§ 102(e) Date: Oct. 26, 1990

[87] PCT Pub. No.: WO89/12742

PCT Pub. Date: Dec. 28, 1989

[30] Foreign Application Priority Data

Jun. 22, 1988 [DE] Fed. Rep. of Germany ....... 3821023

[51] Int. Cl.[5] ...................... F02N 15/04; F02N 15/06; F16H 57/00

[52] U.S. Cl. .......................................... 74/6; 74/7 E; 74/411; 290/38 C; 290/48; 475/345; 475/902; 123/179.25

[58] Field of Search .................... 74/6, 7 R, 7 A, 7 E, 74/411; 123/179 M; 290/38 C, 48; 475/345, 902

[56] References Cited

U.S. PATENT DOCUMENTS

| | | | |
|---|---|---|---|
| 2,306,539 | 12/1942 | Jones | 74/7 |
| 2,591,734 | 4/1952 | Smith et al. | 74/411 X |
| 2,857,777 | 10/1958 | Porter | 74/411 X |
| 3,362,256 | 1/1968 | Cluff et al. | 74/7 E X |
| 3,557,633 | 1/1971 | Frerichs | 74/411 X |
| 4,680,979 | 7/1987 | Morishita et al. | 74/411 X |
| 4,951,515 | 8/1990 | Morishita et al. | 74/7 E |

*Primary Examiner*—Allan D. Herrmann
*Assistant Examiner*—David W. Laub
*Attorney, Agent, or Firm*—Michael J. Striker

[57] ABSTRACT

The starting device for an internal combustion engine includes a housing, an electrical drive motor (10) with a drive shaft (16), a starting pinion (12) for engagement with a rim gear of the engine and an intermediate gear (11) making an operative connection between the drive shaft and the starting pinion. For damping or absorption of the shocks and preventing fractures arising from the compression stroke of the starting engine the starting pinion (12) is connected directly or indirectly nonrotatably with the gear shaft (24) of the intermediate gear (11) and the gear shaft (24) is coupled with a hollow wheel (21) via an elastic damping ring (34). The drive shaft (16) meshes with its outer toothing (19) in the internal toothing (20) of the hollow wheel. The hollow wheel (21) is received in a bearing (25) in the housing and the damping ring (34) is made of rubber or plastic, is inserted in the hollow wheel (21) and, surrounds the gear shaft (24). The external toothing (35) of the damping ring (34) engages in the internal toothing (20) of the hollow wheel (21) and the external toothing (33) of the gear shaft (24) intermeshes with the internal toothing (36) of the damping ring (34) so that torque is transmitted from the hollow wheel, when driven by the electric motor, to the gear shaft.

4 Claims, 1 Drawing Sheet

STARTING DEVICE FOR AN INTERNAL-COMBUSTION ENGINE WITH START-UP SHOCK DAMPING

BACKGROUND OF THE INVENTION

The invention relates to the starting device for an internal-combustion engine.

A starting device for an internal combustion engine is known, comprising a housing, an electric drive motor having a drive shaft, a starting pinion for engagement with a rim gear of the engine, and an intermediate gear making an operative connection between the drive shaft and starting pinion and having a gear shaft. The gear shaft is arranged eccentrically relative to the drive shaft and the starting pinion is arranged longitudinally on the gear shaft movably longitudinally for engagement with the rim gear. A hollow wheel is mounted freely rotatable on the gear shaft by a sleeve and has an internal toothing, in which the free end of the drive shaft mounted on both ends in the housing of the starting device meshes by means of an external toothing. The starting pinion is nonrotatably rigidly connected to the gear shaft and the hollow wheel and the gear shaft are coupled to one another via an elastic connecting element.

In a known starting device of this type, so-called geared starters with an eccentrically arranged hollow-wheel gear (German Offenlegungsschrift 3,100,869), the sleeve in one piece with the hollow wheel of an intermediate gear carries a coarse thread, on which a driver is arranged screwably. The diver is connected via a freewheel to the starting pinion which is arranged rotatably and displaceably on the gear shaft. The driver can be displaced axially by an engaging relay, with the result that the starting pinion can shift into the rim gear of the internal-combustion engine projecting into its displacement path. When the starting pinion has shifted in, the drive motor is switched on. This rotates the starting pinion via the intermediate gear, the driver and the free wheel.

Compression and expansion surges of the internal-combustion engine to be started give rise to shocks in the gear train transmitting the torque of the drive motor, and these can cause fractures in the gear train. This danger is intensified by the intermediate gear, because the shock forces are increased as a result of the step-up ratio of the intermediate gear.

Furthermore, French Published Patent Application FR-A-2,521,641 (Ducellier) published Aug. 19, 1983 describes a starting device or internal-combustions engines with an electric drive motor, in which the hollow wheel and the gear shaft of the intermediate gear are coupled to one another via elastic connecting elements, in order to damp or partially absorb the shocks occurring there and originating from the internal-combustion engine. However, the disadvantage of this solution is that only the gear shaft with the drive pinion is mounted in the housing of the starting device, and therefore the hollow wheel connected to the drive shaft solely via the damping members can come out of place when shocks occur. In the long term, the accuracy and true running of the hollow wheel meshing with the pinion of the drive motor are thereby impaired as a result of the transmitted shocks, and this can lead to increased wear the intermediate gear and even to the failure of the rotation mechanism.

SUMMARY OF THE INVENTION

The object of the present solution is, in order to avoid the defects mentioned, to achieve by simple measures a better mounting and shock damping on the intermediate gear of the starting device.

According to the present invention the hollow wheel is similarly received in a bearing arranged in the housing, and the connecting element is designed as a ring, which is inserted in the hollow wheel and surrounds the gear shaft and which is positively connected in a circumferential direction to the hollow wheel on one side and to the gear shaft on the other side.

The advantage of the starting device according to the invention, is that the peaks of the shocks caused by the internal-combustion engine to be started are reduced by means of the elastic connecting element acting as a damper so that the danger of fracture in the parts transmitting the torque of the drive motor is diminished. The damping element is at the same time itself part of the torque-transmission train, the hollow wheel connected to it being mounted directly in the housing. Since, according to the invention, the connecting element is designed as a ring which is inserted in the hollow wheel and surrounds the gear shaft and which is positively connected in the direction of rotation to the hollow wheel on the one hand and to the gear shaft on the other hand, the elastic connection between the hollow wheel and the gear shaft can be made in a simple way.

At the same time, there is no need for any extension of the starting device in comparison with a starting device without such a damping element, because, as a result of the shock absorption of the elastic ring, the axial tooth length of the internal and external toothing between the hollow wheel and the drive shaft can be made smaller and space thereby provided for the ring width.

Advantageously the ring has an external toothing which is shaped so as to be engageable with the internal toothing of the hollow wheel. Similarly the gear shaft and the ring can intermesh via corresponding external and internal toothings and the hollow wheel and the sleeve can be connected to one another in a single piece by a radial flange so that the ring bears against the radial flange. The external toothing of the gear shaft and the internal toothing of the ring are attached to mutually parallel cone shell surfaces which ascend to the end of the gear shaft. The ring man be either rubber or molded from plastic.

DESCRIPTION OF THE DRAWING

The invention is explained in detail in the following description by means of an exemplary embodiment illustrated in the drawing. In this.

DESCRIPTION OF THE EXEMPLARY EMBODIMENT

Figure 1:
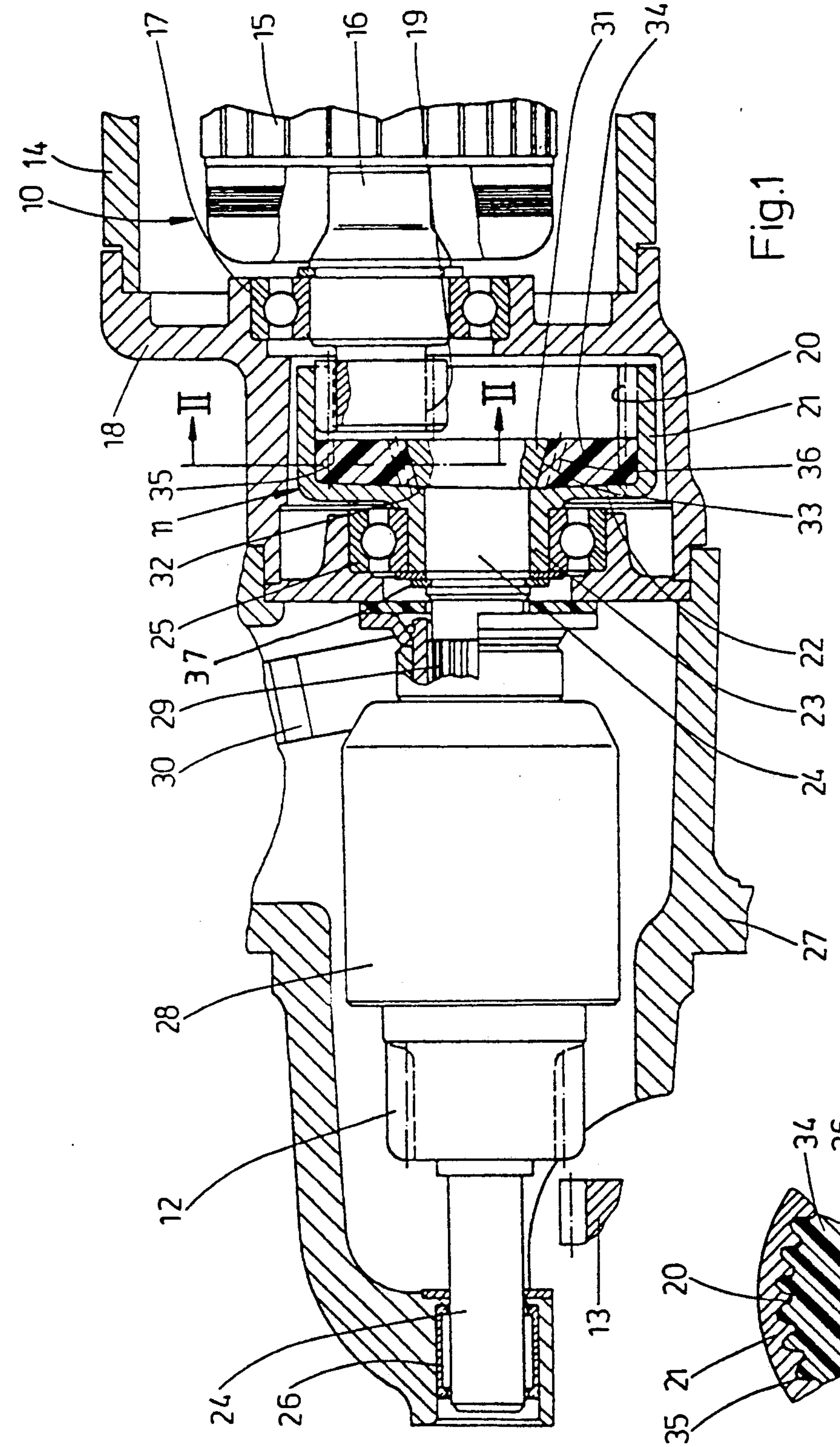
FIG. 1 is a longitudinal cross sectional view through an exemplary embodiment of a starting device according to the invention.

The geared starter shown in longitudinal section in FIG. 1 as an example of a starting device for an internal-combustion engine has an electric drive motor 10, an intermediate gear 11 and a starting pinion 12 which, by an engaging relay not shown here, can be engaged with a rim gear 13, indicated in part of the internal-combustion engine. Of the electric drive motor 10 of known design, it is possible to see the housing 14 the rotor 15 and the drive shaft 16 which is connected rigidly to the rotor 15 and which is mounted in a bearing 17 in the housing cover 18 and projects at the end beyond the bearing 17. The end portion of the drive shaft 16 carries an external toothing 19 which meshes with an internal toothing 20 within a hollow wheel 21 of the intermediate gear 11. The hollow wheel 21 is arranged freely rotatably on a gear shaft 24 of the intermediate gear 11 by a sleeve 23 formed in a single piece with the hollow wheel via a radial flange 22.

The hollow wheel 21 with the sleeve 23 and the gear shaft 24 received therein is arranged eccentrically relative to the drive shaft 16 and aligned parallel to it. The hollow wheel 21 together with the sleeve 23 is mounted in the housing cover 18 via a bearing 25 and the gear shaft 24 is mounted at the front in the bearing 26 in a gear housing 27 flanged on the housing cover 18. The starting pinion 12 arranged rotatably and longitudinally movably on the gear shaft 24 is coupled in transmission terms to a freewheel gear 28. Via a spur toothing 29 on the gear shaft 24, the freewheel gear 28 is rigidly connected in terms of rotation to the latter and can be displaced longitudinally on the gear shaft 24 via a lever 30 actuated by the engaging relay, the starting pinion 12 thereby shifting into the rim gear 13 of the internal-combustion engine.

Figure 2:
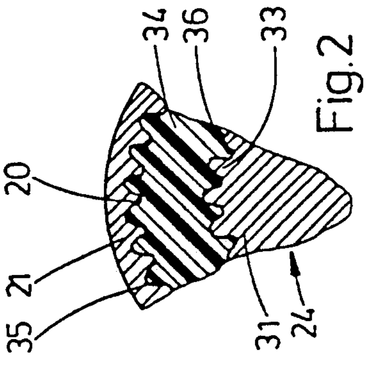
FIG. 2 is a cutaway transverse cross sectional view a portion of the device of FIG. 1 taken along the line II—II of FIG. 1.

The gear shaft 24 projects with a cone 31 located at its end into the interior of the hollow wheel 21, the radial flange 22 of the hollow wheel 21 bearing against an annular shoulder 32 which is provided on the end face of the cone 31 of smaller diameter. The shell surface of the frustoconical cone 31 is equipped with axial teeth 33. The largest diameter of the cone 31 is substantially smaller than the clear inside diameter of the hollow wheel 21. The axial length of the cone 31 amounts to less than half the depth of the hollow wheel 21. Moreover, the axial length of the end portion of the drive shaft 16, which meshes with its external toothing 19 in the internal toothing 20 extending over the entire depth of the hollow wheel 21, is approximately only half as large as the depth of the hollow wheel 21, so that the drive shaft 16 terminates at a short distance in front of the free end face of the cone 31 of the gear shaft 24. Inserted into the interspace between the cone 31 and the inner wall of the hollow wheel 21 is an elastic damping ring 34, for example made of rubber, which couples the hollow wheel 21 fixedly in terms of rotation to the gear shaft 24. At the same time, the damping ring 34 engages positively with an external toothing 35 into the internal toothing 20 of the hollow wheel 21. The inner shell surface of the damping ring 34 which is made frustoconical correspondingly to the cone 31 and carries an internal toothing 36 which projects positively between the axial teeth 33 on the shell surface of the cone 31 of the gear shaft 24 (FIG. 2). The form resembling a bevel wheel of the intermeshing toothings of the cone 31 and damping ring 34 bearing with one end face against the radial flange 22 and held by a retaining ring 37 secures the damping ring 34 against axial displacement, so that the rotationally fixed connection between the hollow wheel 21 and the gear shaft 24 is reliably maintained. The damping ring 34 reduces the peaks of the shocks caused by the internal-combustion engine to be started, so that the danger of a fracture in the drive train transmitting the torque from the drive motor 10 to the starting pinion 12 is largely avoided.

The damping 34 can be made of rubber as above or it can be an elastic plastic ring injection molded into the hollow wheel.

It will be understood that each of the elements described above, or two or more together, may also find a useful application in other types of structure differing from the types described above.

While the invention has been illustrated and described as embodied in a starting device for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed a new and desired to be protected by Letters Patent is set forth in the appended claims.

I claim:

1. In a starting device for an internal-combustion engine having a rim gear, said starting device comprising an electric drive motor (10) having a drive shaft (16) with a drive shaft end remote from the electric drive motor (10), a starting pinion (12) engageable with the rim gear (13) of the internal-combustion engine, a housing cover (18) and an intermediate gear (11) making an operative connection between the drive shaft (16) and the starting pinion (12), the intermediate gear (11) having a gear shaft (24), which is arranged eccentrically relative to the drive shaft (16) and on which the starting pinion (12) is mounted longitudinally movably so as to be engageable with said rim gear (13), and the intermediate gear (11) also having a hollow wheel (21) freely rotatably mounted on the gear shaft (24) by a sleeve (23) formed in one piece with the hollow wheel, and the hollow wheel (21) having an internal toothing (20) and the drive shaft end remote from the electric motor (10) having an external toothing (19) formed according to the internal toothing (20) and meshing by the external toothing (19) with the internal toothing (20) of the hollow wheel (21), the starting pinion (12) being indirectly or directly attached rigidly and nonrotatably to the gear shaft (24), and the hollow wheel (21) and the gear shaft (24) being coupled to one another via an elastic connecting element, the improvement comprising a bearing (25) mounted in the housing cover (18) to receive the sleeve (23) of the hollow wheel (21), and wherein the elastic connecting element is formed as an elastic damping ring (34), said damping ring (34) being mounted in the hollow wheel (21) so as to surround the gear shaft (24), and, wherein the damping ring (34) has an external toothing (35) and an internal tooting (36), and the gear shaft (24) has an external toothing (33), said external toothing (35) of the damping ring (34) being shaped according to the internal toothing (20) of the hollow wheel (21), and wherein said external toothing (35) of the damping ring (34) engages in the internal toothing (20) of the hollow wheel (21) and the damping ring (34) has an internal toothing (36), the external toothing (33) of the gear shaft (24) intermeshing with the internal toothing (36) of the damping ring (34).

2. The improvement as defined in claim 1, wherein the hollow wheel (21) and the sleeve (23) are connected to one another in one piece via a radial flange (22), the elastic damping ring (34) bears against the radial flange (22), and wherein the external toothing (33) of the gear shaft (24) and the internal toothing (36) of the elastic damping ring (34) are mutually parallel and diverge towards the end of the drive shaft (16) remote from the electric drive motor (10).

3. The improvement as defined in claim 1, wherein the ring (34) is made of rubber.

4. The improvement as defined in claim 1, wherein the elastic damping ring (34) is injection-molded and made from plastic.

* * * * *